United States Patent
Friedrich

[15] 3,692,928
[45] Sept. 19, 1972

[54] ELECTRICAL BUSHING HAVING A CAPACITOR CHAIN FORMED BY OVERLAPPING CAPACITOR ELEMENTS

[72] Inventor: Kevin F. Friedrich, Sharon, Pa.
[73] Assignee: Westinghouse Electric Corporation, Pittsburgh, Pa.
[22] Filed: May 24, 1971
[21] Appl. No.: 146,236

[52] U.S. Cl. ............................................. 174/143
[51] Int. Cl. ........................................... H01b 17/28
[58] Field of Search ......... 174/73 R, 73 SC, 142, 143

[56] References Cited

UNITED STATES PATENTS

| | | | |
|---|---|---|---|
| 1,834,212 | 12/1931 | Jansson | 174/143 |
| 1,868,605 | 7/1932 | Jansson | 174/143 UX |
| 2,650,334 | 8/1953 | Skeats | 174/143 X |
| 3,248,599 | 4/1966 | Masuda | 174/143 X |

FOREIGN PATENTS OR APPLICATIONS

| | | | |
|---|---|---|---|
| 656,127 | 1/1963 | Canada | 174/73 R |
| 289,850 | 8/1928 | Great Britain | 174/143 |

*Primary Examiner*—Laramie E. Askin
*Attorney*—A. T. Stratton and Donald R. Lackey

[57] ABSTRACT

An electrical bushing having electrical insulation disposed about an axially extending conductor, and a plurality of stress grading elements disposed in the insulation to grade radial and longitudinal stresses in the bushing. These stress grading elements includes at least two groups of substantially tubular elements, with the elements of each group being axially spaced and dimensioned such that the wall portions of each group are substantially aligned. The aligned space between two elements of one group is bridged by an element of an adjacent group.

12 Claims, 4 Drawing Figures

ELECTRICAL BUSHING HAVING A CAPACITOR CHAIN FORMED BY OVERLAPPING CAPACITOR ELEMENTS

BACKGROUND OF THE INVENTION

1. Field of the Invention

The invention relates in general to electrical bushings, and more specifically to high voltage electrical bushings suitable for use with power transformers and power circuit breakers.

2. Description of the Prior Art

High voltage electrical bushings for power transformers and power circuit breakers include a plurality of capacitor plates or elements disposed in the insulation surrounding the axially extending electrical conductor, to more uniformly distribute electrical stress throughout the insulation, and thus utilize the insulation more effectively. The proper positioning of the capacitor elements, and maintaining the elements in position, was not a problem with the prior art condenser type bushings which built up the capacitor section by winding paper about a form, as metallic foils of the desired length and width could be easily placed between the turns of the paper at the required intervals as the capacitor section was being wound. However, with the development of high strength, weather resistant, castable, non-tracking solid resinous insulation systems, it became desirable to form the capacitor section of certain types and ratings of electrical bushings, with the capacitor plates being disposed through the resulting cast solid insulating structure. This replaces the oil impregnated paper capacitor assemblies of the prior art, as well as the fragile, porcelain shells used to contain the oil and provide weatherproof housings for the capacitor section. The cast condenser bushing, however, introduces manufacturing problems in an entirely new area, as the thin metallic or semiconductive capacitor foils or plates must be accurately positioned within the casting mold, and their positions must be maintained while a highly filled liquid casting resin system is introduced into the mold, and subsequently gelled and cured to a solid. While many workable solutions to the problem have been proposed, they have approached the problem by using the same general type of capacitor arrangement used with the prior art paper type condenser bushings. It would be desirable to simplify the capacitor structure of the cast type bushings, if this could be accomplished without incurring offsetting disadvantages.

SUMMARY OF THE INVENTION

Briefly, the present invention is a new and improved high voltage electrical bushing of the cast condenser type. However, instead of employing a large plurality of radially spaced capacitor foils, as used in prior art wound type condenser bushings, a new and improved capacitor structure is utilized which lends itself to cast type bushing construction.

More specifically, it was found that with solid, cast resin insulation systems, a more effective capacitor structure would be one in which the primary function of the capacitor or stress grading elements is to grade the electrical stresses longitudinally, with the radial grading of the electrical stresses being of lesser importance. The cast solid resinous insulation systems are excellent in puncture strength, and thus they do not require the same radial grading that a capacitor type bushing requires which is formed of paper impregnated with oil. However, the longitudinal grading must be highly efficient in order to uniformly distribute the voltage stresses across the length of the bushings, and thus reduce the magnitude of local stress concentrations which may promote creepage along outer surfaces of the bushing.

The capacitor structure is formed by utilizing at least two groups of substantially tubular stress grading elements, disposed coaxially about the bushing conductor. The elements of each group are axially spaced from one another and dimensioned such that their wall portions are substantially aligned. The two aligned groups are radially spaced, and axially offset to bridge each space between two elements of one group with an element from another group, with the bridging element overlapping the ends of the two spaced elements in the adjacent group. Thus, a capacitor chain is formed from each end of the electrical bushing to the ground layer of the bushing, which uniformly distributes longitudinal electrical stresses, and the radially spaced groups provide the required radial grading of stress. The reduced number of radial layers substantially reduces the complexity of casting the capacitor section, as adding axially spaced elements to cast type bushings does not present the manufacturing problem that a relatively large plurality of radial elements presents.

BRIEF DESCRIPTION OF THE DRAWINGS

The invention may be better understood, and further advantages and uses thereof more readily apparent, when considered in view of the following detailed description of exemplary embodiments, taken with the accompanying drawings, in which.

DESCRIPTION OF PREFERRED EMBODIMENTS

Figure 1:
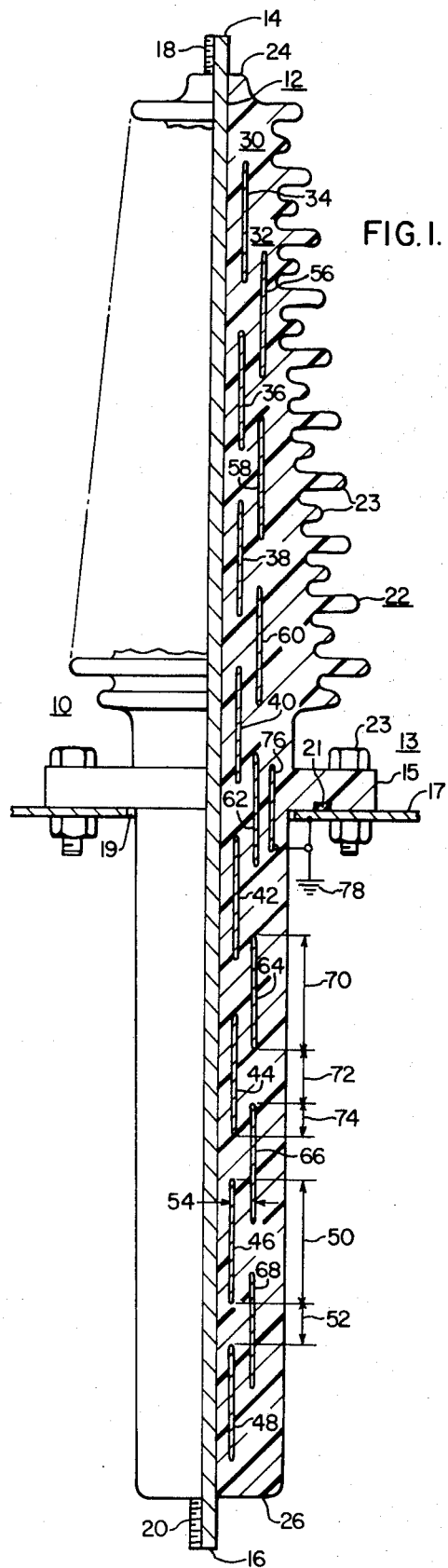
FIG. 1 is an elevational view, partially in section, of an electrical bushing constructed according to a first embodiment of the invention.

Referring now to the drawings, and FIG. 1 in particular, there is shown an elevational view, partially in section, of a high voltage electrical bushing 10 constructed according to a first embodiment of the invention. Bushing 10, which may be used with power transformers or power circuit breakers, has a generally elongated shape, and includes a centrally or axially extending electrical conductor 12 having first and second ends 14 and 16, respectively, formed of a good electrical conductor, such as copper or aluminum. Conductor 12 may be threaded adjacent to its ends 14 and 16, as illustrated at 18 and 20, respectively, in order to provide means for connecting external and encased electrical leads thereto, respectively.

Electrical conductor 12 has an insulating body member or portion 22 disposed thereon having first and second ends 24 and 26, respectively, which ends are spaced from the first and second ends 18 and 20, respectively, of the electrical conductor 14. Insulating body member 22 is formed of a cast solid resinous insulation system. The cast resinous insulation system is preferably thermosetting, but thermoplastic resin systems may be used if their softening temperatures are well above the maximum operating temperature of the electrical bushing, and they are compatible chemically with the liquid dielectric disposed in the associated apparatus. In general, the resin system of which the body portion 22 is formed should be mechanically strong, weather resistant, it should have a low shrinkage factor upon curing, it should provide good adhesion to conductor 12, and have excellent crack resistance upon thermal cycling. The resinous polymeric epoxies have been found to be excellent.

The resin system selected may be filled with suitable finely divided, inorganic fillers, to obtain nontracking characteristics, to reduce shrinkage upon curing of the resin system, to more closely match the coefficient of thermal expansion of the resin system with the conductor 12, and to provide other desirable characteristics. Suitable fillers which may be used are alumina trihydrate ($Al_2O_3 \cdot 3H_2O$), quartz, and silica.

Mounting means 13 is disposed intermediate the ends 24 and 26 of the solid insulation, and it includes a flange member 15 adapted to rest against the casing 17 of the associated electrical apparatus, about an opening 19 disposed therein. The bushing 10 is disposed through the opening 19, and a gasket 21 may be disposed between the flange 15 and the casing 17 to seal the opening 19. The flange 15 may be an integral portion of the body member 22, as illustrated in FIG. 1, or it may be a separate member which is attached to the body member 22 by any suitable means, such as an adhesive. The body member 22 includes a plurality of weather sheds 23 on the weather end of the bushing 12, and these weather sheds may be cast integrally with the remaining body portion of the bushing, or the cast body portion of the bushing may be formed with a smooth exterior on the weather end, and a separate weather housing disposed tightly about the smooth surface, which would then include the weather sheds.

The desired axial and radial stress grading of bushing 10 is provided by a new capacitor arrangement which utilizes a relatively large plurality of axially spaced capacitor elements, enabling the number of radially spaced tiers of capacitor elements to be substantially reduced. The construction of prior art cast type condenser bushings has largely utilized the general capacitor element arrangement of the prior art wound type condenser sections. However, cast solid insulation systems have a different electrical insulating characteristic than wound paper insulating sections, and advantage of this fact is taken to change the stress grading approach, and as a result provide a capacitor structure which lends itself to the production of cast type high voltage bushings.

More specifically, FIG. 1 illustrates first and second groups of stress grading elements or capacitor plates, indicated generally by reference numerals 30 and 32, respectively. The first group 30 includes a plurality of substantially tubular stress grading elements 34, 36, 38, 40, 42, 44, 46 and 48, disposed coaxially with the electrical conductor 12. Each of the stress grading elements in the first group 30 has a predetermined longitudinal dimension, and the longitudinal dimensions of the elements may be the same for all elements of the group, or they may be varied according to a predetermined plan. The longitudinal dimension is illustrated with reference numeral 50 on stress grading element 46.

The stress grading elements of the first group 30 are axially spaced from one another by a predetermined dimension, or dimensions, such as indicated by the reference numeral 52 between stress grading elements 46 and 48. The axial spacing of the stress grading members of the first group 30 may be uniform between adjacent pairs across the group, or the spacing may be changed in a predetermined manner. The stress grading elements of the first group 30 may be formed of good electrical conductors, such as copper or aluminum, they may be formed of partially conductive material, such as carbon, or they may be formed of semiconductive material, i.e., material having a voltage dependent resistivity, such as paint containing finely divided silicon carbide. Further, it is not necessary that all of the capacitor elements of the first group be formed of the same types of material, as in certain applications it may be desirable to utilize a combination of conductive and semiconductive materials.

In the embodiment of the invention shown in FIG. 1, the stress grading elements of the first group 30 are in the form of straight cylinders, and it is important to note that the wall portions of the cylinders are substantially aligned from one end of the bushing 10 to the other. The alignment of the wall portions greatly facilitates the manufacture of the bushing, as the stress grading elements may be applied in the form of paint to an insulating tubular support member which extends from one end of the bushing mold to the other, and this tubular support member may be formed of mesh, such as disclosed in U.S. Pat. No. 3,513,253, which is assigned to the same assignee as the present application, or this support tube may have a solid wall, as desired. Alternatively, the stress grading elements of the first group 30 may be formed by constructing the bushing with a plurality of successive casting operations, wherein a first body member is cast about the electrical bushing conductor 12, with the diameter of the first body member being the required diameter for the stress grading elements. After the first body member is cast, the axially spaced stress grading elements of the first group 30 may then be easily applied, such as by painting the elements on the outer surface of the body member. Constructing a cast electrical bushing by successive casting steps is disclosed in U.S. Pat. No. 3,394,455, which is assigned to the same assignee as the present application.

The second group 32 of stress grading elements includes a plurality of substantially tubular capacitor plates, such as plates or elements 56, 58, 60, 62, 64, 66 and 68. The stress grading elements of the second group 32 are axially spaced, and they have a larger diameter than the stress grading elements of the first group, to provide a predetermined radial spacing between the first and second groups 30 and 32, respectively, such as the radial spacing 54 indicated between stress grading elements 46 and 66. Each of the stress grading elements of the second group 32 has a predetermined longitudinal dimension, such as the dimension 70 indicated for element 64, and the longitudinal dimensions of the elements of the group may be the same, or they may be varied in a predetermined pattern to provide specific capacitive values, as desired. The stress grading elements of the second group 32 are axially spaced, with the axial spacing between adjacent pairs being uniform, or varied, as desired. The axial spacing is indicated by reference numeral 72 between elements 64 and 66 of the second group 32.

The second group of stress grading elements are axially offset, relative to the first group 30, such that each space between adjacent pairs of stress grading elements of the first group 30 is bridged by a stress grading element of the second group. For example, the space 52 between elements 46 and 48 of the first group 30 is bridged by element 68 of the second group. Further, in addition to bridging the space, the elements overlap by predetermined dimensions to provide predetermined capacitive values between the overlapping elements of the two groups. An example of this overlapping of radially spaced elements is illustrated by reference numeral 74, which illustrates the overlap between stress grading elements 44 and 66.

If the bushing 10 is constructed by using insulating support tubes disposed within the mold, thus requiring only one casting step, the second group 32 of stress grading elements may be easily formed by providing a second support tube of the required diameter, upon which the stress grading elements are painted or otherwise suitably formed thereon.

If the first group 30 of stress grading elements was formed on a first body member cast about electrical conductor 12, a second casting step could be used to provide a second cast body portion, disposed about the first body member, which has a smooth outer surface upon which the stress grading elements of the second group 32 may be disposed. A third casting step may then be used to complete the insulating body portion 22 of the bushing, including the formation of the weather sheds 23, if desired.

One of the stress grading elements of the second group 32 may be used as the ground layer of the bushing, or in the event that separate ground and tap layers are required, a separate ground layer 76 may be disposed adjacent to the mounting means 13 of the bushing 10. In this instance, the stress grading element 62 may be used as a tap layer, with a lead (not shown) being connected from the layer 62 to a terminal accessible on the outer surface of the bushing 10. The ground layer 76 is connected to the casing 17 during normal use of the electrical bushing, and the casing 17 is grounded as shown at 78. The grounding of the layer 76 may be accomplished by connecting the ground layer 76 via a suitable electrical lead to a metallic sleeve or washer member disposed such that a mounting bolt, such as mounting bolt 23, may be telescoped therethrough and make electrical contact therewith, when bolts are used to mount the electrical bushing 10 to the casing 17, as illustrated in the example of FIG. 1.

Figure 2:
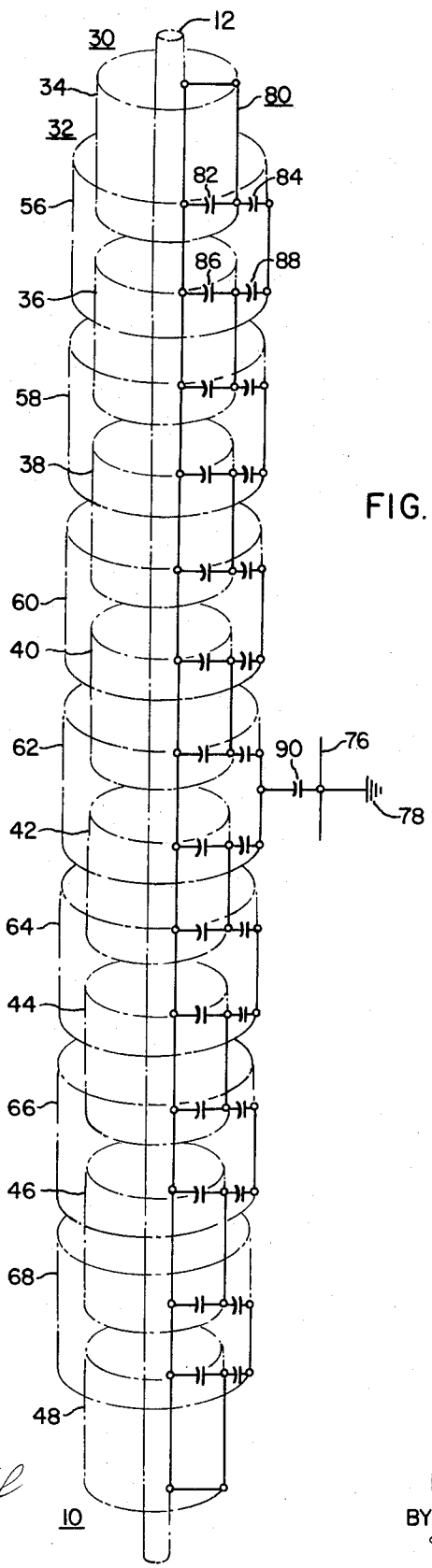
FIG. 2 is a perspective view of the conductor and stress grading element arrangement for the electrical bushing shown in FIG. 1, along with a schematic representation of the resulting capacitive structure.

FIG. 2 is a perspective view of the conductor 12 and the first and second groups 30 and 32 of stress grading elements, with the conductor and stress grading elements being shown in phantom, in order to illustrate more clearly the resulting capacitor structure 80 which is formed by the disclosed stress grading arrangement. As illustrated, each of the stress grading elements of the first group 30 provides a capacitance between the element and conductor 12, such as capacitors 82 and 86 shown connected between conductor 12 and stress grading elements 34 and 36, respectively. Further, each of the overlapping stress grading elements of the second group provides two capacitors between itself and the two stress grading elements of the first group which it overlaps. For example, a first capacitor 84 is provided between one end of stress grading element 56 and one end of stress grading element 34. A second capacitor 88 is provided between stress grading element 56 and stress grading element 36. It will be noted that the disclosed arrangement of stress grading elements provides a chain or ladder of capacitors which extend from each end of the bushing to ground 78. The stress grading elements at each end of the ladder, i.e., elements 34 and 48, are preferably directly connected to conductor 12. Element 62 is connected to ground 78 via the capacitance 90 between itself and the ground layer 76. This arrangement of parallel and serially connected capacitors uniformly grades the distribution of electrical stress from the ends 14 and 16 of conductor 12 to ground 78, and the two radially disposed groups of stress grading elements also provide radial stress grading, such as illustrated by the serially connected capacitors 82 and 84.

Figure 3:
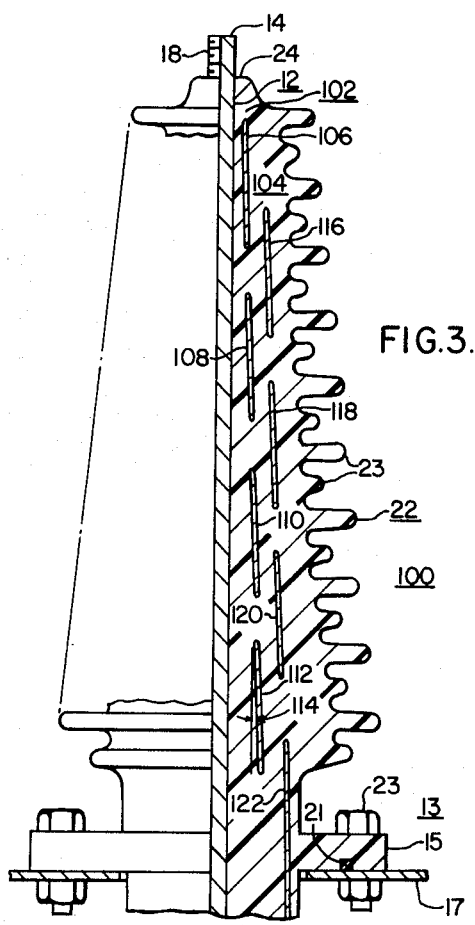
FIG. 3 is a fragmentary elevational view, partially in section, of an electrical bushing constructed according to another embodiment of the invention.

In the embodiment of the invention illustrated in FIG. 1, the stress grading elements are illustrated as being straight cylinders, but they may have other configurations, as required by a specific application. For example, FIG. 3 is a fragmentary elevational view, partially in section, of a bushing assembly 100 which is similar to the bushing 10 shown in FIG. 1, except for the configuration of the stress grading elements. Like reference numerals in FIGS. 1 and 3 indicate like components.

More specifically, the stress grading elements of the bushing 100 shown in FIG. 3 are arranged into first and second groups 102 and 104, but instead of using straight cylinders, the stress grading elements are substantially frustrum shaped, having a first diameter adjacent to one end of the conductor 12, and a larger diameter facing the mounting means 13 of the bushing. The first group 102 includes a plurality of stress grading elements 106, 108, 110 and 112, with the deviation of the elements away from a straight cylinder being illustrated by the angle 114 relative to the stress grading element 112. The stress grading elements of the first group 102 which are disposed in the encased end of the bushing 100 are also frustrum shaped, but oriented opposite to the orientation of the elements associated with the weather end of the bushing 100, i.e., the lower end of the element would have a smaller diameter than the upper end. It should be noted that while the stress grading elements of the first group 102 are in the shape of a frustrum, their wall portions are still substantially aligned, thus facilitating manufacture of the stress grading elements, such as by the successive casting method.

The second group 104 includes a plurality of frustrum shaped stress grading elements 116, 118, 120 and 122, which are axially spaced with their wall portions aligned, and axially displaced relative to the elements of the first group, such that they overlap the spaces between the elements of the first groups as described relative to the embodiment of the invention shown in FIG. 1.

Figure 4:
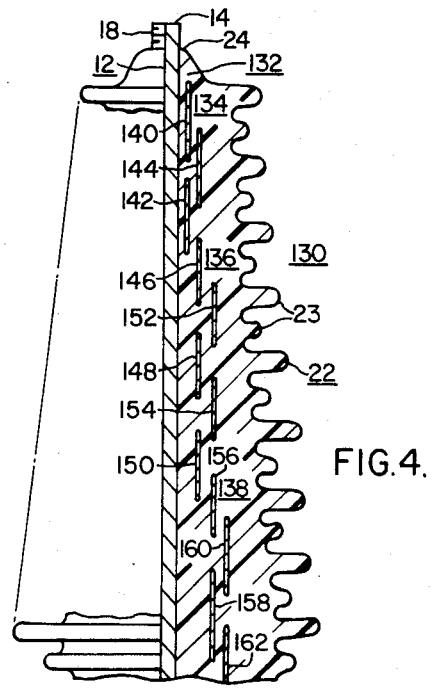
FIG. 4 is a fragmentary, elevational view, partially in section, of an electrical bushing constructed according to still another embodiment of the invention.

While in most applications only two groups of axially spaced stress grading elements will be required, in certain voltage ratings it may be necessary to utilize three or more tiers or groups of stress grading elements, but in these instances the number of tiers will still be substantially less than would be required with the conventional type of capacitor arrangement, and similar to the embodiment described using two groups, there will be a maximum of two stress grading elements at any location perpendicular to conductor 12, regardless of the number of groups used. FIG. 4 is a fragmentary elevational view, partially in section, of a bushing assembly 130 constructed according to an embodiment of the invention which has four tiers or groups of stress grading elements, with like reference numerals in FIGS. 1 and 4 indicating like components. Bushing assembly 130 includes first, second, third and fourth groups 132, 134, 136 and 138, respectively. The first group 132 of stress grading elements, which group is closest to conductor 12, includes axially aligned elements 140 and 142 in the weather end of bushing 130, and a plurality of elements in the encased end, such as two (not shown). The second group 134 includes elements of larger diameter than the elements of the first group, and includes elements 144, 146, 148 and 150 in the weather end, and a plurality in the encased end (not shown). The first element 144 of the second group 134 overlaps the first two elements of the first group 132. The third group 136 includes a plurality of stress grading elements 152, 154, 156 and 158, in the weather end, and a plurality in the encased end, with these elements being disposed in axially spaced relation such that they bridge the spaces between adjacent pairs of elements in the second group, starting with second and third elements 146 and 148 of the second group. The fourth group 138 includes a plurality of stress grading elements such as elements 160 and 162, with these elements being axially spaced from one another, and axially displaced relative to the elements of the third group, such that they bridge the spaces between adjacent pairs of elements in the third group, starting with third and fourth elements 156 and 158 of the third group. Thus, regardless of the number of tiers, only two elements have overlapping ends at any location perpendicular to conductor 12.

In summary, there has been disclosed a new and improved condenser bushing, which takes advantage of the excellent electrical strength of cast solid insulation in puncture to provide a capacitive arrangement which facilitates the manufacture of cast type bushings. The number of radial tiers required is reduced, and the number of axially spaced capacitor elements is increased, to provide excellent longitudinal stress grading throughout the bushing, and also provide the required radial stress grading through the bushing structure. In cast type bushings, the number of axially spaced, aligned, stress grading elements presents little problem to the manufacture thereof, resulting in an overall lower manufacturing cost for the cast type bushing.

While the disclosed stress grading element structure is best suited for use with cast solid insulation systems, it may also be used to advantage with wound paper type construction, especially when the paper is impregnated with resin. However, in certain applications it may be beneficially used with the conventional paper-oil construction.

I claim as my invention:

1. An electrical bushing adapted for mounting in the casing of electrical apparatus, comprising:
   an axially extending electrical conductor having first and second ends,
   solid insulating means disposed about said electrical conductor,
   stress grading means disposed in said solid insulating means, including at least first and second groups of substantially tubular stress grading elements disposed coaxially with said electrical conductor,
   said first group of stress grading elements being axially spaced from one another and dimensioned such that their wall portions are substantially in alignment,
   said second group of stress grading elements being axially spaced from one another and dimensioned such that their wall portions are substantially in alignment, with the resulting aligned group being radially spaced from the first aligned group of stress grading elements,
   said first and second groups of stress grading elements being axially offset from one another such that each of the stress grading elements of the second group overlaps the ends of two stress grading elements, said stress grading elements being disposed such that there is a maximum of two stress grading elements above ground potential at any location perpendicular to said conductor.

2. The electrical bushing of claim 1 wherein at least certain of the stress grading elements are in the form of a frustrum.

3. The electrical bushing of claim 1 wherein at least certain of the stress grading elements are in the form of a straight cylinder.

4. The electrical bushing of claim 1 wherein at least certain of the elements are formed of a semiconductive material having a voltage dependent resistivity.

5. The electrical bushing of claim 1 wherein the axial lengths of the stress grading elements are substantially the same.

6. The electrical bushing of claim 1 wherein the axial lengths of at least certain of the stress grading elements are different.

7. The electrical bushing of claim 1 wherein the axial spacing in each group of stress grading elements is the same.

8. The electrical bushing of claim 1 wherein the axial spacing between the stress grading elements in each group is changed in a predetermined pattern.

9. The electrical bushing of claim 1 wherein the radial spacing between the aligned groups is the same from one end of the bushing to the other.

10. The electrical bushing of claim 1 wherein the radial spacing between adjacent aligned groups changes in a predetermined relationship from one end of the busing to the other.

11. The electrical bushing of claim 1 including at least one additional group of stress grading elements, with the elements of the first and second groups, and the elements of the at least one additional group being axially located such that each space between adjacent stress grading elements of one group is bridged by a stress grading element from an adjacent group, without any overlapping of elements of the first and third groups.

12. An electrical bushing adapted for mounting in the casing of electrical apparatus, comprising:
- an axially extending electrical conductor having first and second ends,
- insulating means disposed about said electrical conductor,
- stress grading means disposed in said insulating means, including a plurality of groups of substantially tubular stress grading elements disposed coaxially with said electrical conductor,
- the elements in each of said groups being axially spaced from one another and dimensioned such that their wall portions are substantially in alignment,
- each of said aligned groups being radially spaced from one another,
- the elements in the plurality of groups being axially offset from one another such that each space between adjacent stress grading elements of one group is bridged by a stress grading element from an adjacent group, with a maximum of two elements overlapping at any location perpendicular to said conductor.

* * * * *